US006957387B2

(12) United States Patent
Barbieri

(10) Patent No.: US 6,957,387 B2
(45) Date of Patent: Oct. 18, 2005

(54) APPARATUS FOR REPRODUCING AN INFORMATION SIGNAL STORED ON A STORAGE MEDIUM

(75) Inventor: Mauro Barbieri, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 528 days.

(21) Appl. No.: 10/129,694

(22) PCT Filed: Sep. 5, 2001

(86) PCT No.: PCT/EP01/10255

§ 371 (c)(1),
(2), (4) Date: May 8, 2002

(87) PCT Pub. No.: WO02/21529

PCT Pub. Date: Mar. 14, 2002

(65) Prior Publication Data

US 2003/0020743 A1 Jan. 30, 2003

(30) Foreign Application Priority Data

Sep. 8, 2000 (EP) ........................................... 00203098

(51) Int. Cl.[7] ................................................ G09G 5/00

(52) U.S. Cl. ...................... 715/719; 715/721; 715/722; 725/41; 725/44; 382/216; 382/219; 382/220

(58) Field of Search ................................ 715/716, 726, 715/719–723, 732; 725/44, 37, 41; 382/216, 219, 220

(56) References Cited

U.S. PATENT DOCUMENTS

| | | | | | |
|---|---|---|---|---|---|
| 5,521,841 | A | * | 5/1996 | Arman et al. | 715/723 |
| 6,195,458 | B1 | * | 2/2001 | Warnick et al. | 382/173 |
| 6,366,296 | B1 | * | 4/2002 | Boreczky et al. | 715/719 |
| 6,580,437 | B1 | * | 6/2003 | Liou et al. | 715/719 |
| 6,636,220 | B1 | * | 10/2003 | Szeliski et al. | 345/475 |
| 6,710,822 | B1 | * | 3/2004 | Walker et al. | 348/722 |
| 6,774,917 | B1 | * | 8/2004 | Foote et al. | 715/700 |
| 6,801,294 | B2 | * | 10/2004 | Jo | 352/44 |
| 6,807,306 | B1 | * | 10/2004 | Girgensohn et al. | 382/225 |
| 6,819,797 | B1 | * | 11/2004 | Smith et al. | 382/181 |

OTHER PUBLICATIONS

Hong Jiang Z. et al, "An Integraed System for Content–Based Video Retrieval and Browsing", Pattern Recognition, Pergamon Press Inc., Elmsford, NY vol. 30, No. 4, Apr. 1, 1997, pp. 643–658, XP004059159.

Patent Abstracts of Japan, vol., 2000, No. 23, Feb. 10, 2001, JP 2001177805.

Patent Abstracts of Japan, vol. 2000, No. 23, Feb. 10, 2001, JP2001177806.

* cited by examiner

*Primary Examiner*—Tadesse Hailu

(57) ABSTRACT

An apparatus for reproducing an information signal stored on a first storage medium (4). The apparatus comprises a reading unit (2) for reading the information signal from the first storage medium, an output unit (6) for supplying the information signal to a display unit, an user controllable input unit (8) for receiving commands to enable an user to access the information signal. The user controllable input unit is adapted to receive a first command at an instant. The apparatus further comprises a unit (10) for controlling the reading unit to start reading the information signal from said storage medium at a second position in the information signal in response to said first command, the information signal at said second position having features showing a similarity with features of the information signal at a first position read at said instant of receiving said first command, or a features of an information signal read prior to said instant.

9 Claims, 3 Drawing Sheets

APPARATUS FOR REPRODUCING AN INFORMATION SIGNAL STORED ON A STORAGE MEDIUM

Figure 1:
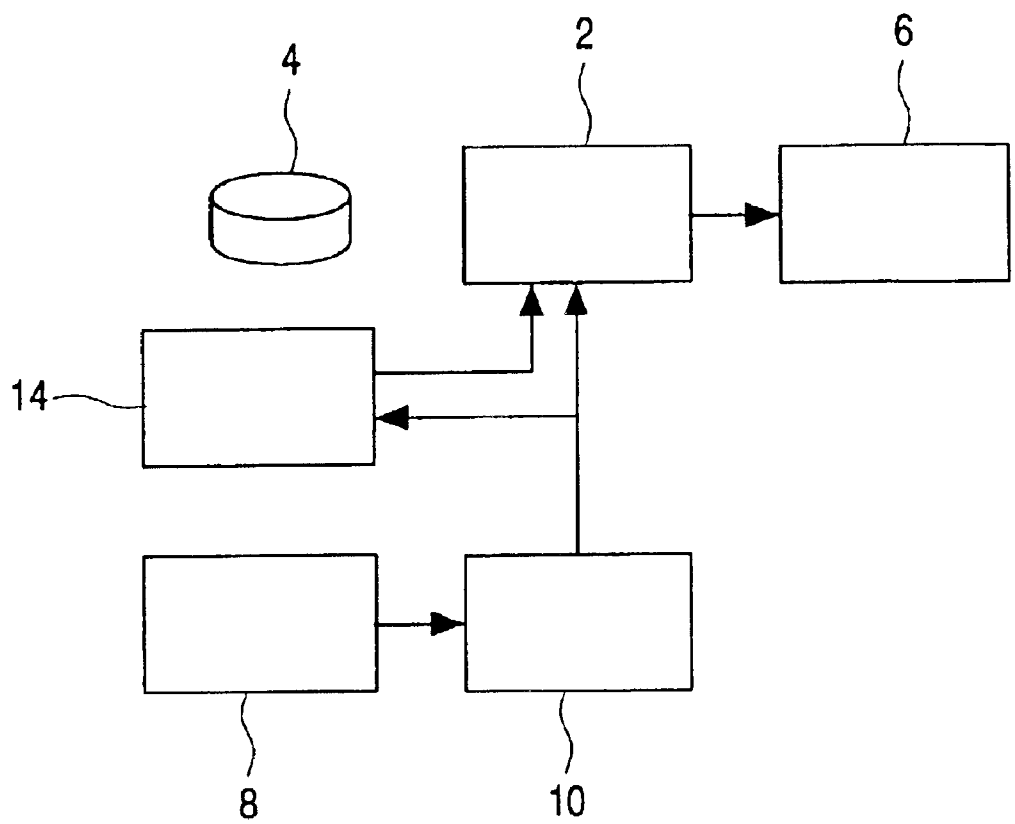

The invention relates to an apparatus for reproducing an information signal stored on a first storage medium, the apparatus comprises:

- reading means for reading the information signal from the first storage medium,
- output means for supplying the information signal to a display unit,
- user controllable input means for receiving commands to enable user to access the information signal.

The invention further relates to a method of reproducing an information signal stored on a storage medium, a computer program, and a tangible medium and signal carrying said computer program.

Traditionally video is viewed and accessed in a linear manner using the basic VHS tapes functionality: play, fast forward and rewind.

Video recorders based on hard disks are rapidly appearing on the market. They dramatically increase the amount of stored information, which can also be accessed randomly. Traditional VCR functions like fast forward and rewind do not exploit this feature and neither help users to rapidly browse the video content.

The current trend is to provide, together with the audio video information, a description of the content (the upcoming international standard MPEG-7 aims to create a standard set of descriptors for multimedia content). This description has to be exploited in such a way as to allow home users to search rapidly and effectively within hours of recorded programs. The major issue is the user-system interaction. However the easy to use and intuitive tools are restricted to performing keywords based search.

Up till now fast forward and rewind are the most common easy-to-use tools to access and browse video material recorded on a tape or disc medium. However, they are becoming inadequate because of the dramatic increase of multimedia data that can be stored in home devices.

It is an object of the invention to provide another easy to use and intuitive tools suitable to search rapidly and effectively within video material such as hours of recorded programs or databases with images, such as pictures or slide shows.

An apparatus in accordance to the invention is characterized in that user controllable input means are adapted to receive a first command at an instant, the apparatus further comprises means for controlling the reading means to start reading the information signal from said storage medium at a second position in the information signal, the information signal at said second position showing a similarity with the information signal at a first position read at said instant of receiving said first command, or a part of the information signal read prior to said instant.

The invention is based on the following recognition. A lot of programs, such as news programs, talk shows, weather forecast, are broadcast very frequently. In these kind of programs the background of the images are almost the same. Furthermore, the same person acts in a program. In a news program normally during the change of news items the newsreader is shown. By searching for images in which the newsreader is present it will be possible to jump to the next news item. This feature allows users to jump from an image in the video stream to the next (previous) "similar" one. In a preferred embodiment of the invention the similarity criteria (the evaluation of the level of similarity between two images) can be based on low-level features extracted from the video signal (like color, texture, shape, and edges) or on auxiliary information, such as higher-level descriptions which are manually or semi-automatically generated. The jump to the next (previous) similar image functionality is independent from the way the images are compared and from the concept of similarity used. Content-based image retrieval is a well-known technique in the multimedia retrieval field. This invention employs its results and gives to the users a powerful, intuitive and very easy to use tool for browsing video data. The goal of our invention is to allow access points to video data based on the video content. During the normal play-back, or by using another way of accessing the video content like, for example, a key-frame browser, the user implicitly selects the current image as query image, the system performs the operations required to retrieve similar images, it selects only one result with the further constraint of being the "next (previous)" and, finally, it jumps to the correspondent position in the video stream. This functionality can be implemented using two buttons, one for each search direction. In this way, the only operation a user has to perform to jump to an interesting part of a program is to press a button. Therefore the invention is especially suitable for supporting end-users in browsing through video material in consumer digital video recorders.

These and other aspects of the invention will be apparent from and elucidated by means of three embodiments with reference to the drawings.

Embodiments of the invention will now be described in more detail, by way of example, with reference to the drawings, in which FIG. 1 shows an embodiment of an arrangement in accordance with the invention.

Figure 2:
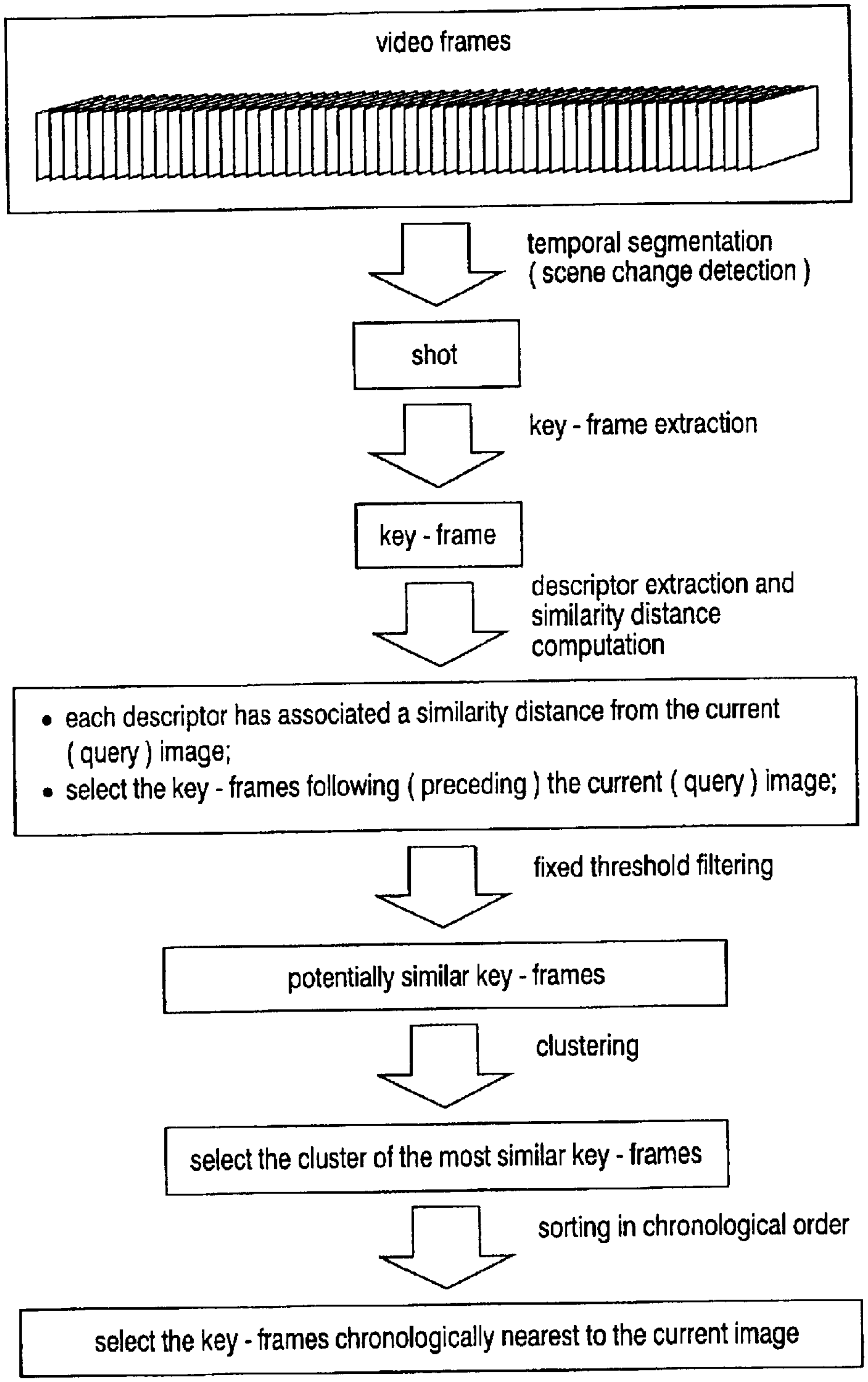
Figure 3:
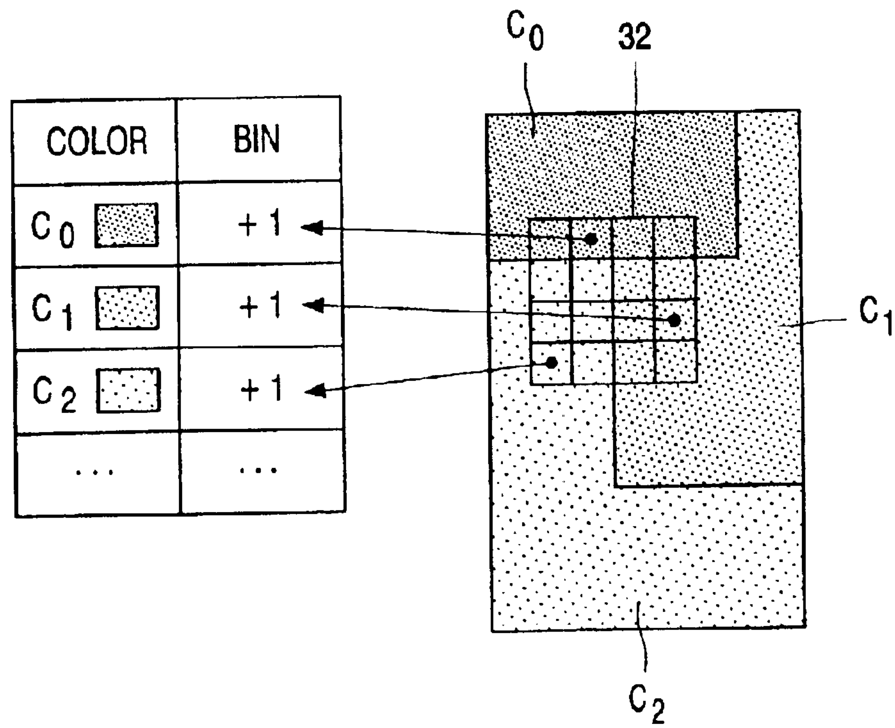
Figure 4:
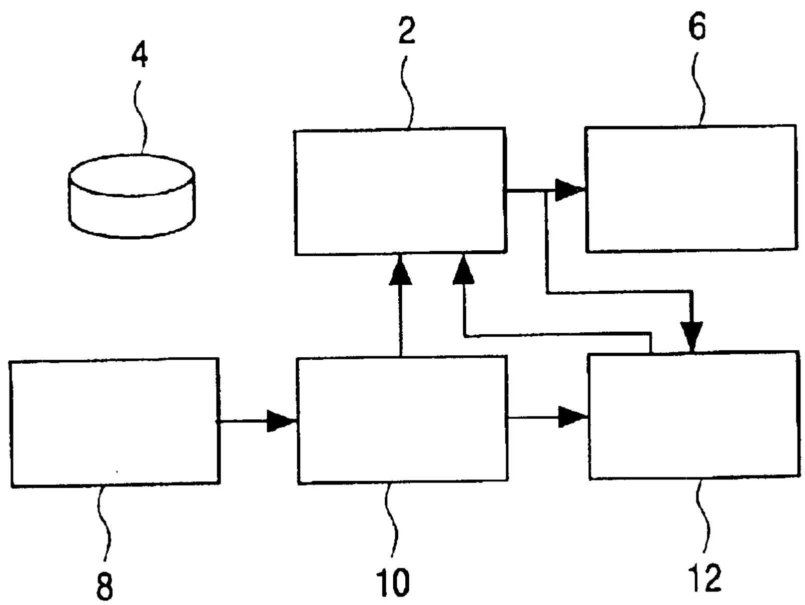

FIG. 2 shows the steps to be taken to be able to perform the jump to next similar image functionality, FIG. 3 illustrates the extraction procedure with a visual item of 8 different colours, and FIG. 4 shows another embodiment of an arrangement in accordance with the invention FIG. 1 shows an embodiment of an arrangement in accordance with the invention. The arrangement comprises a reading unit 2 for reading an information signal stored on a storage medium 4. The apparatus may have the functionality known from video recorders or Set-Top boxes, which comprise a recording medium. The information signal may be a TV signal stored on a prerecorded record carrier (such as CD or Tape) or on a recording device such as a Hard Disk Drive. The information signal could be any kind of information that could be displayed on a screen. In a preferred embodiment the information signal is a video signal comprising a sequence of images. However the invention could be used for browsing through any kind of collections of images, such as pictures stored on a recording medium, or a collection of slide shows. The storage medium could be in the form of a Hard Disc Drive, a removable storage medium for example an optical disc (such as DVD or CD) or solid state memory. However any other suitable storage medium for storing a huge amount of information could be used. The information signal read from the storage medium is supplied to an output unit 6 for supplying the information to a display unit, not shown. The display unit could be incorporated in the arrangement.

The arrangement further comprises a user controllable input unit 8 for receiving commands to enable a user to access and view the information signal recorded. The user controllable input unit is preferable in the form of a remote control. However, the use of speech control may be suitable as well. A controllable input unit in the form of a remote control preferably comprises a key for generating the command "jump to next similar image" and a key for generating the command "jump to previous similar image". The commands are supplied to a control unit 10. The control unit is arranged for controlling the reading unit 2. When the reading unit is in normal play mode in dependence of a jump to next similar the control unit is adapted to stop reading the information signal from the recording medium and to jump to a next image having similar visual descriptors as the image read when the jump to next similar image command was received. Methods of determining what similar images are and what the next or previous similar image will be described hereafter in more detail. The visual descriptors of an image may be specified by the color information of the images. However other visual descriptors are suitable, such as the description of the content in accordance to the MPEG-7 standard.

The arrangement further comprises a search unit 14 arranged to find the next/previous similar image. After reception of a "skip to next/previous" command the search unit will first determine the visual descriptor of the information signal read at the instant said command was given. In a first embodiment of the search unit the determines the visual descriptors for the information signal read by the reading unit 2 by reading the visual descriptor corresponding to the information signal read from a database. The database could be stored on the storage medium 4 together with the information signal. However the database could be stored on every suitable storage medium accessible for the search unit. For example the database could be stored on a server that is accessible via an internet connection. The database comprises information about the images in the information signal having similar visual descriptors and their positions in the information signal. For example if the information signal is a recorded video program, the database comprises a table with for each scene in the video program a record. Further more each record has a pointer to the next similar visual descriptor (read image) in the video program and a pointer to the previous similar visual descriptor in the video program. Thus when the "skip to next/previous command is received, the search unit reads the record corresponding to the scene currently read and supplies the position of the next/previous image to the read unit 2. The read unit starts reading the information signal at the position supplied by the search unit 14.

The database could be obtained from a service provider via any suitable connection, for example telephone line or cable. The database could also be send simultaneously with the recorded program. The database could also be generated in the arrangement simultaneously with the recording of the information signal on the recording medium. Therefore the apparatus comprises an extraction unit, not shown. During recording of the information signal on the recording medium, the information signal is supplied to the extraction unit. The extraction unit generates visual descriptors for the information signal, for example for each scene. The visual descriptors will be stored in a database on a recording medium. Said recording medium is not necessarily the same as the recording medium on which the information signal is stored. Methods to extract the visual descriptors will be described hereafter. Furthermore, the apparatus comprises a unit, which determines which for each scene which image or scene should be regarded as the next and previous similar image. The position of said images will be stored in the respective locations in the database. Methods to determine said images will also be described hereafter in more detail.

The database may be in the form of a linked list in which every entry comprises a pointer to a next and/or a previous position in the information signal. However an entry of the database may comprises information about the content at said positions, a position may be a signal image of a part of the information signal, for example a scene. In response to the command "jump to similar" the search unit searches in the database for the the next position. The database, which is a type of table of content, may be organized in several suitable manners. The database may comprise several lists. Every list has a relationship with a defined characteristic. The positions of parts of the information signal having the same characteristic are placed in the same list and preferably sorted sequentially by their position in the information signal. The command "jump to next" can now be realized by searching the list and entry in said list corresponding to the read position at the instant of receiving said command. By taking the next entry in the list, the reading unit can be controlled to read the information signal at the position corresponding to said next entry.

In another embodiment of the database, each entry in the database corresponds to a position in the information signal. Every time the command "Jump to Next" is received, the table of content is sorted again. The order of the entries is determined by the extent of similarity with the entry corresponding to the read position at the instant of receiving the command. This embodiment enables the user to jump to that part of the information signal that is most similar.

FIG. 4 shows an embodiment of an arrangement of the invention, which is suitable for skipping through an information signal, which comprises a sequence of images, such as a video program. Preferably the information signal is in the form of an MPEG video signal. In this embodiment the search unit has an input to receive the information signal from the reading unit 2. After receiving the "skip to next/previous similar image" command the search unit will first determine the visual descriptor of the information signal currently read. Then the read unit 2 will be placed in a search mode. In this mode the reading through the information signal is faster than in normal mode. The information signal could be read fully from the recording medium or only partially, for example only the I-frames of an MPEG signal. The signal read is supplied to search unit 14, the search unit extracts visual descriptors from the signal supplied and analysis whether or not the extracted visual descriptor is similar to the visual descriptor of the information signal read when receiving the command. As soon as an similar descriptor is found the read unit 2 will return in the normal mode.

The jump to the next similar image functionality can be used in several useful tasks. A selection of examples where it can be applied follows.

It can be employed to skip commercial breaks when the broadcaster uses a still image (e.g. a full screen channel logo) to distinguish between the program and the start (end) of commercials.

It is very useful to jump to the next news item using the anchor person image in a news program. News programs are usually broadcast with subtitles so we can assume to have very detailed and precise textual information about them. With this hypothesis it seems to be better to use keyword-based search instead of the jump to the next (previous) similar image functionality for them. Anyway, this tool allows jumping rapidly from one piece of news to the next (previous) one without requiring the user to read textual information.

It allows jumping to the weather forecast or to the sport news or to a particular section within a program which has a fixed heading.

It can be used to jump to the beginning or to the end of a program, which has its own fixed credit or end titles.

Musical programs that are a collection of video clips are nowadays rather common. The jump to the next (previous) similar image functionality may be used to jump from a video clip to the next one.

Many documentaries have special sections on different topics that start with a particular logo. The user can jump directly to the logo, which indicates the next subject, without any need of time consuming fast forward.

Like in the two last examples the jump to the next/previous similar image button can be used in every program with the structure (same letters correspond to similar frames):

AAAAAAAAbbbbbbbbAAAccccccAAAdddAAAAeeeee eeeeeeeeeAAAAAAAAAAAA . . .

to jump between A frames. In news programs, A frames correspond to the anchorperson reading a piece of news. In documentaries, they correspond to scenes where a showman (showgirl) presents the subjects and they are interleaved with documentary items. Almost the same happens in TV shows where in A frames a showman (showgirl) presents events to happen or guests to appear. As in shows, a showman (showgirl) usually introduces musical video clips. Indeed this structure is very common in normal broadcast TV programs.

It could seem that similar results could be achieved by structuring the video into scenes and by using just a jump to the next scene button. The browsing functionality in according to the invention differs from the more traditional hierarchical way of pre-structuring the video as it allows to jump directly to the next similar scene, not only to the next scene or keyframe. The jump to the next (previous) similar image functionality can be used for the purpose of video navigation but also for browsing through pictures or slide shows.

Trailers of video programs can be very useful when they are at the beginning of a program or when they are in the form of commercials as well. In the former case the user can choose an image from the trailer and jump to the same image in the program once it has been broadcast and recorded. In this way the user is able to start viewing the video program at the position which corresponds to said image. In the latter case (i.e. headings in a news program), the user can exploit an image chosen from the trailer to jump to the interesting part within the program. In this case the trailer can be seen as a table of content for the program.

If we enable users to select some images as favorite images, the jump to the next/previous similar image can be based on them. Instead of using an image part of the video stream, the user can be allowed to choose between a set of favourite ones. This so-called favourite image list allows, for example, the following scenarios:

- The user is watching a news program and he discovers that his favourite rock band has made a new video clip. The news program contains only a one-minute preview of the video. The user saves one significant image of the video in his favourite image list and he records a couple of hours of video clips confidant that the new video clip will be transmitted. The day after he can try to find the whole video clip in the recorded material by employing the previous saved image.
- The user is watching a news program and he learns that Hakkinen, with the Mc Laren F1 car, had a very bad accident in the afternoon. He had recorded the whole race but he does not want to see it because he has no time at the moment. Now he can jump to the sequence of the car crash using an image of the accident from the news program stored in his favourite image list.

The jump to the next (previous) similar image functionality requires every image of a video sequence to be associated to the next (previous) most similar one. Two consecutive frames are usually very similar. In jumping to the next (previous) similar image, these frames have to be discarded. One solution could be to take into account only one frame within a group of successive similar frames. This is equivalent to segmenting a video into shots, choosing a representative still image (key-frame) for each shot, and then searching for similarity only between key-frames.

It is important to notice that the jump to the next/previous similar image functionality is independent from the way the descriptors are obtained and from the way the similarity is measured.

In a preferred implementation, from each key-frame, a visual descriptor is automatically extracted. Two key-frames are assumed to be similar if the distance between their visual descriptors is lower than a predefined threshold. The jump to the next (previous) similar image function takes into account not only the similarity but also the relative positions of the frames because it has to retrieve just one next (previous) similar image. FIG. 2 shows the steps performed by the preferred implementation.

When the user presses the jump to the next similar image button, the system retrieves the descriptors of the following shots and performs two filtering operations. First, it compares the visual descriptor of the query key-frame with the descriptors of the following (preceding) key-frames. Key-frames whose descriptors have a distance from the query greater than a fixed threshold are discarded. The second filtering operation consists in dividing the remaining key-frames into, at least, two clusters, depending on their distance from the query in the feature space. The two clusters are obtained by sorting the images according to their similarity and by considering the successive differences between their distances from the query. When one of these differences exceeds a certain threshold, then all the successive images are put into a separate cluster. The cluster of images closest to the query is sorted according to the chronological order and the first frame is the one which corresponds to the next similar.

Below some details about the visual descriptors that could be used will be described.

Current pattern matching and image understanding techniques are still too far from the goal of interpreting visual content in semantic terms. Thus it is necessary to rely on low-level visual characteristics. Colour, texture, shape and motion are the most commonly used perceptual visual features. Colour information has been proven to be rather robust to occlusion, image size and orientation. Texture descriptors are powerful for classifying homogeneous texture patterns, however they are not effective in dealing with non-homogeneous regions in natural scenes. Also shape descriptors could be used. As these descriptors require image segmentation which requires a lot of computing power, they are currently too expensive for consumer electronics products. Furthermore, the currently available image segmentation techniques are not robust enough for generic real-world images.

The human perception of colour is a complex process. When dealing with visual data and colour representations, several simplifying assumptions are made. Colour features are treated at pixel level that means that the perception of a colour is not influenced by the surrounding colours. Furthermore viewing conditions, such as ambient lighting, viewer distance and display quality are not considered. First a definition of a visual item is given. A visual item I is a whole image or any arbitrary shaped region (rectangular or irregular) of an image represented as a set of pixel values in a colour space CS.

The following paragraphs present a set of descriptors that encode quantitative representations of perceptual visual features. The extraction procedures and the similarity matching criteria associated are also presented.

The colour histogram is a very known way of describing low level colour properties of visual items. It can be represented as three independent colour distributions or as one distribution over the colour channels. The colour histogram is defined for a given visual item I in a colour space CS, discretized such that there are n distinct colours. A colour histogram H(I) is a vector $<H_1, H_2, \ldots, H_n>$ in which each element $H_j$ contains the percentage of pixels of the colour $C_j$ in the visual item I.

Colour histograms are a rather efficient representation of colour content. A positive aspect is that their computation is efficient. Moreover, colour histograms are fairly insensitive to variations originated by camera rotation, zooming, changing in resolution and partial occlusions. However, they are sensitive to light conditions and they may have problems in representing colour content because of colour space quantization. Quantization must be fine enough that perceptually distinct colours are not in the same bin. This consideration can be applied to all the histogram-based descriptors presented in the following sections.

The Colour Histograms Extraction is performed by computing for each pixel value in the visual item the quantized value and to increment the correspondent bin in the histogram. The number of pixels in the bins should then be normalized according to the size of the visual item. This last step can be avoided if dealing with visual items of identical dimensions. It should be noted that the extraction procedure requires a linear time.

Different distance measures could be used to determine the chromatic similarity using colour histograms. They lead to different retrieval performances regarding both the effectiveness and the computational complexity. Together with the choice of the colour space and of the colour quantization, the choice of the similarity-matching criterion, is a crucial aspect in the implementation of visual retrieval techniques.

Three commonly used similarity measures for colour histograms are the $L_1$ distance, the Euclidean or $L_2$ distance and the quadratic distance. Let $H(I_q)$ and $H(I_t)$ be the query and the target histograms, respectively, then the $L_1$ distance is defined by $$D_1 = \sum_{i=1}^{n} |H_i(I_q) - H_i(I_t)| \tag{2.1}$$

The Euclidean distance or $L_2$ distance is defined by $$D_2 = \sqrt{\sum_{i=1}^{n} (H_i(I_q) - H_i(I_t))^2} \tag{2.2}$$

In these definitions, differences across colour buckets are weighted evenly. Both the $L_1$ and the $L_2$ distances neglect to compare similar, but not same, histogram elements. For example, a dark red image is equally dissimilar to a red image as to a blue image. By using measures of histogram element similarity within the distance computation, it is possible to improve histogram matching.

The quadratic distance measure addresses this issue and it is defined by $$D_3=(H_i(I_q)-H_i(I_t))^T W(H_i(I_q)-H_i(I_t)) \tag{2.3}$$

where $W=[a_{ij}]$ and $a_{ij}$ denotes the perceptual similarity of the colours with indexes i and j. This metric compares all histogram elements, and weights the inter-element distances by pair-wise weighting factors. An appropriate value for the cross-correlation at is given by $a_{ij}=1-d_{ij}$ where $d_{ij}$ is the distance between the colours of indexes i and j normalized with respect to the maximum distance between two colours in the colour space. The quadratic distance is computationally more expensive than the $L_1$ and $L_2$ distances since it computes the cross-similarity between all elements.

When the compression algorithm adopted in the MPEG-2 standard is used, it is possible at low cost, to extract from the video stream, with only partial decoding, rescaled versions (64 times smaller) of the frames called DC-images. They are obtained by considering only the DC coefficients of the bidimensional discrete cosine transform of the 8×8 blocks of a full-size frame. Since DC-images are smaller rescaled or block-resolution versions of the frames, it can be assume that they represent the same content. For the purpose of retrieving similar key-frames, it is possible to extract the visual descriptors directly from the DC-images that are available, for the I-frames, at low cost in the digital video stream. In an MPEG stream a I-frame could be regarded as key-frame. To simplify their implementation, the extraction procedures have been designed to take as input an array of pixel values in a specified colour space. It is also possible to integrate them with the scene change algorithm and to perform the computation of the descriptors limiting the MPEG-2 decoding to the minimum required.

The colour histogram descriptor could be used in both the $YC_bC_r$ and in the HSV colour spaces. The $YC_bC_r$ colour space is preferable as it is the format used in the MPEG-2 standard, thus the colour information directly extracted from the video stream do not require a further transformation. Moreover, even if it is not strictly perceptually uniform, from this point of view, it is better than the RGB colour space used to display the key-frames in the user interface.

Next three different colour quantizations of the $YC_bC_r$ colour space that could be used are defined. It should be noted that other quantizations are suitable as well.

- The Y, $C_b$ and $C_r$ colour channels were linearly quantized respectively into 16, 4 and 4 levels. The resulting descriptor can be seen as a single variable histogram of 256 bins.
- The Y, $C_b$ and $C_r$ colour channels were linearly quantized respectively into 16, 8 and 8 levels. The resulting descriptor can be seen as a single variable histogram of 1024 bins.
- The Y, $C_b$ and $C_r$ colour channels were linearly quantized respectively into 16, 16 and 16 levels. The resulting descriptor can be seen as a single variable histogram of 4096 bins.

The HSV colour space is suitable as well because it is approximately perceptually uniform therefore a compact and complete collection of colours can be obtained by defining a proper quantization. The conversion from RGB to HSV is accomplished through the following equations [36]:

$$v=\max(r,g,b)$$

$$s = \frac{v - \min(r, g, b)}{v}$$

$$6h = \begin{cases} 5 + b' & \text{if } r = \max(r, g, b) \text{ and } g = \min(r, g, b) \\ 1 - g' & \text{if } r = \max(r, g, b) \text{ and } g \neq \min(r, g, b) \\ 1 + r' & \text{if } g = \max(r, g, b) \text{ and } b = \min(r, g, b) \\ 3 - b' & \text{if } g = \max(r, g, b) \text{ and } b \neq \min(r, g, b) \\ 3 + g' & \text{if } b = \max(r, g, b) \text{ and } r = \min(r, g, b) \\ 5 - r' & \text{otherwise} \end{cases}$$

where (r,g,b) is a point in the RGB space, (h,s,v) the corresponding point in the HSV space and (r',g',b') are defined, when max(r,g,b)≠min(r,g,b), as follows:

$$r' = \frac{v - r}{v - \min(r, g, b)}$$

$$g' = \frac{v - g}{v - \min(r, g, b)}$$

$$b' = \frac{v - b}{v - \min(r, g, b)}$$

For r,g,b∈[0 . . . 1], the conversion gives h,s,v∈[0 . . . 1]. The colour space quantization needed to compute a discrete colour histogram is designed to produce a compact set of 166 colours [5, 7, 8, 19, 23]. Believing that hue is the perceptually more significant feature, the finest quantization has been used for it. The hue circle of the cylindrical HSV colour space has been divided by steps of 20 degrees. In this way, the three primaries and yellow, magenta and cyan are represented each with three sub-divisions. Saturation and value are each quantized to three levels yielding greater perceptual tolerance along these dimensions. By employing 18 hues, 3 saturation, 3 values plus 4 additional grey, 166 distinct colours are considered (18×3×3+4=166).

Four colour histograms, obtained by considering the three $YC_bC_r$ quantizations and the HSV one, were extracted from both the full-size images and the DC-images. Thus, each key-frame had 8 different colour histograms associated.

Colour histograms of different images could be compared by using the $L_1$ and the Euclidean distances. Between the three quantizations in the $YC_bC_r$ colour space, the best results were obtained using the 256 bins histograms extracted from the DC-images and compared with the $L_1$ distance. Thus, the $L_1$ distance turned out to perform better than the more expensive Euclidean one. Moreover, it has been found that extracting histograms from DC-images, rather than from the full-size frames, does not degrade the retrieval performances of this descriptor.

It has been found that the 166 bins histogram in the HSV colour space, extracted from the DC-images, outperformed the $YC_bC_r$ one. This result is due to the fact that the HSV colour space is approximately perceptually uniform and the quantization into 166 distinct colours provides a better colour range than the 256 discretization of the $YC_bC_r$ colour space.

Although a global colour description such as the one provided by a colour histogram could be reasonably discriminative, the lack of spatial information can give too many false positives in comparing visual items. Perceived dissimilar retrieved visual items may have very similar colour histograms. To improve retrieval effectiveness and precision, both colour feature and spatial relations can be used. The colour grid histogram and the following histogram-based descriptors extend the global colour feature to a local one by taking spatial information into consideration as well.

To extend the global colour feature represented by conventional colour histograms, a natural approach is to divide the visual item into sub-blocks and to extract colour features from each of the sub-blocks. The colour grid histogram follows this approach and it can be composed of ten histograms. In that case the visual item is divided into nine regions using a 3×3 squared grid. From each region a conventional colour histogram is computed. The tenth histogram is the colour histogram of the whole visual item. The sub-blocks division can be improved by considering overlapping regions. With this approach, the descriptor can be relatively insensitive to small region transformations.

The colour grid histogram extraction procedure is essentially identical to the conventional colour histogram one. The only difference is that the histogram elements to be incremented depend also on the spatial positions of the pixel values in the visual item.

Since the colour grid histogram is composed of conventional colour histograms, the same distance metrics used for comparing histograms can be used for the sub-blocks histograms. The distance between two colour grid histograms will be the total sum of the sub-blocks distances. Additionally we may weight the distances between the sub-block histograms according to their position in the image. For example, the central block could be weighted more than the others could since for most visual items, the central area attracts the attention of the observer; hence humans give more importance to the centre of an image in judging similarity.

The colour grid histogram descriptor has been implemented by dividing the full-size key-frames into 9 regions using a 3×3 square grid, and by computing for each sub-block a 64 bins colour histogram. Additionally, another 64 bins histogram is computed for the entire image. Thus, the descriptor is composed of 10 histograms.

Each histogram is computed in the $YC_bC_r$ colour space. The Y, $C_b$ and $C_r$ colour channels were each one linearly quantized into 4 levels. Preferably the $YC_bC_r$ colour space is used as colour information in the MPEG-2 stream is available in this format.

The distances used to compare colour grid histograms of different images were the sum of the $L_1$ distances or of the Euclidean distances between corresponding sub-area histograms. Additionally, we weighted the distances between the sub-block histograms according to their position in the image. The central block distance was weighted from 2 to 10 times more than the others.

Experimental tests show for the same images, that the colour grid histogram gave better results but in average it did not perform better than the conventional one. Even by using different weights in the computation of the distance, the retrieval effectiveness did not improve enough considering the additional costs of its extraction, comparison and storage.

Colour structure histograms or (also named in literature blob histograms) express the local colour structure of visual items using structuring elements that are comprised of several pixel values. Conventional colour histograms characterise the relative frequency of single pixel values with a particular colour. Colour structure histograms differ from them because they encode the relative frequency of structuring elements that contain a pixel with a particular colour. They inherit the invariance properties from conventional colour histograms and, by embedding spatial information, significantly increase their discriminative power.

If we consider a colour space CS discretized such that there are n distinct colours, a colour structure histogram for the visual item I can be defined as:

Definition 2: A colour structure histogram H(I) is a vector $<H_1, H_2, \ldots, H_n>$ in which each element $H_j$ contains the number of structuring elements in the visual item I containing one or more pixels of the colour $C_j$.

The spatial extent of the structuring element depends on the visual item size however, the number of samples in the structuring element is held constant by sub-sampling the visual item and the structuring element at the same time. If we choose a number of 64 samples in a structuring element layed out in a 8×8 pattern, the distance between two samples in this pattern increases with increasing visual item sizes. If visual items are resized to a fixed base size, the same 8×8 structuring element can used, otherwise the sub-sampling factor and the structuring element width and height can be determined as follows. Let E be the spatial extent of the structuring element in the original visual item I, i.e., the spatial extent is E×E. Let K be the sub-sampling factor applied, i.e., K={1, 2, 4, 8, 16, . . . }, where K=1 implies no sub-sampling, K=2 implies sub-sampling by 2 horizontally and vertically, etc. K and E are defined as follows:

$$p=\max\{0,\ \mathrm{round}(0.5\cdot\log_2(\mathrm{width}\cdot\mathrm{height})-8)\}$$

$$K=2p$$

$$E=8K$$

Where width and height are referred to the rectangular visual item I. If p<0 then we consider p=0.

The colour structure histogram is computed by visiting all locations of the visual item, retrieving colours of all pixels contained in the structure element overlaid on each location, and incrementing the corresponding bins. The histogram bins can be normalized by the number of structuring elements at the end of the procedure. FIG. 3 illustrates the extraction procedure with a visual item of 8 different colours.

The structuring element 32, a square of size 4 by 4 pixels, is passed over the visual item as a sliding window. At a certain location (in the figure only a portion of the visual item is depicted), the structuring element contains 4 pixels with colour $C_0$, 6 pixels with colour $C_1$ and 6 pixels of colour $C_2$. Then, the bins in the rows $C_0$, $C_1$ and $C_2$ would be incremented. So, in this case, the structuring element is counted three times, once for each colour present in the structuring element area.

Since colour structure histograms, colour correlograms, colour autocorrelograms, colour coherence vectors and joint histograms are all histogram-based descriptors, the same similarity matching criteria presented for conventional colour histograms can be applied in comparing all these other visual descriptors. Distance values in different feature spaces are, of course, not comparable.

A colour correlogram is a table indexed by colour pairs, where the k-th entry for <ij> specifies the probability of finding a pixel of colour $C_j$ at a distance k from a pixel of colour $C_i$. Colour correlograms express how the spatial correlation of colour changes with distance.

Given a visual item I and a colour space CS discretized such that there are n distinct colours, let I(p) denote the colour of the pixel value p∈I. Thus, the notation $p \in I_c$ is synonymous with p∈I,I(p)=c. The distance between pixel values is measured with the $L_\infty$-norm: for pixels $p_1=(x_1,y_1)$, $p_2=(x_{21},y_2)$, we define $$\|p_1-p_2\| \equiv \max\{|x_1-x_2|,|y_1-y_2|\}$$

We denote the set {1, 2, . . . , n} by [n]. With this notation, the colour histogram H(I) is defined ∀i∈[n] by $$h_{c_i}(I) \equiv \Pr_{p\in I}[p \in I_{c_i}]$$

For any pixel value in the visual item I, $h_{c_i}(i)$ gives the probability that the colour of the pixel is $c_i$. Let a distance d∈[n] be fixed a priori. Then the colour correlogram of I is defined ∀i,j∈[m],k∈[d] as $$\gamma^{(k)}_{c_i,c_j} \equiv \Pr_{p_i\in I_{c_i},p_2\in I}[p_2 \in I_{c_i} \mid \|p_1-p_2\|=k]$$

Given any pixel of colour $c_i$ in the image, $\gamma_{c_i c_j}^{(k)}$ gives the probability that a pixel at distance k away from the given pixel is of colour $c_j$.

When the number of different colours in a visual item is high, the spatial and temporal computational complexity of the colour correlogram increases reducing its retrieval performances. This can be partially avoided by considering only the correlation between identical colours. This specialization of the colour correlogram is called colour autocorrelogram. The autocorrelogram of I captures spatial correlation between identical colours only and it is defined by $$\alpha^{(k)}_c(I) \equiv \gamma^{(k)}_{c,c}(I)$$

By including spatial information about the colour distribution over the visual item, colour correlograms and autocorrelograms provide more discriminative power than colour histograms especially when dealing with visual items with similar colours but different colour layout.

The naive algorithm to compute the colour correlogram of a visual item I would be to consider each $p_1$∈I of colour $c_i$ and for each k∈[d], count all $p_2$∈I of colour $c_j$ with $\|p_1-p_2\|$=k. Unfortunately, this takes $O(d^2S)$ time, where S is the total number of pixel values of I. To obviate this expensive computation, in the article "Spatial Color Indexing and Application", International Journal of Computer Vision, Vol. 35, No. 3, 1999, pp. 245–268, an efficient algorithm based on dynamic programming is described. The required computation time is reduced to O(dS).

In terms of retrieval effectiveness, it has been found that the colour autocorrelogram with the $L_1$ distance, performed better than the conventional histogram. Nevertheless, if we take into account the additional costs of its computation, comparison and storage, the best descriptor remains the cheap and effective colour histogram.

The well known colour coherence vectors are basically colour histograms extended to include some spatial information about the colour distribution. The coherence of a colour has been defined as the degree to which pixels of that colour are members of large similarly-coloured regions of a visual item I. Considering a visual item I, each pixel in a given colour bucket of the colour histogram H(I) is classified as either coherent or incoherent, based on whether or not it is part of a large similarly-coloured region. A colour coherence vector (CCV) stores the percentage of coherent versus incoherent pixels with each colour. If we call the percentage of coherent pixels of the j-th discretized colour $\alpha_j$ and the percentage of incoherent pixels $\beta_j$, a colour coherence vector can be represented by a vector of pairs, one for each discretized colour:

$$<(\alpha_1,\beta_1), \ldots, \alpha_n,\beta_n)>.$$

Note that by keeping the same meaning for the symbols $\alpha_j$ and $\beta_j$ a conventional colour histogram can be represented by the vector:

$$<\alpha_1+\beta_1, \ldots, \alpha_n+\beta_n>.$$

Colour Coherence Vectors (CCV's) prevent coherent pixels in one visual item from matching incoherent pixels in another. By separating coherent pixels from incoherent pixels, CCV's provide finer distinctions than colour histograms.

The first step of extracting the colour coherence vector the visual item I is slightly blurred by replacing pixel values with the average value in a small local neighbourhood (typically the eight adjacent pixels). This eliminates small variations between neighbouring pixels. Preferably a discretized colour space of n distinct colours is used.

The next step is to classify the pixels within a given colour bucket as either coherent or incoherent. A coherent pixel is part of a large group of pixels of the same colour, while an incoherent pixel is not. We determine the pixel groups by computing connected components.

Definition 3: A connected component C is a maximal set of pixels such that for any two pixels $p,p' \in C$, there is a path in C between p and p'.

Definition 4: A path in C is a sequence of pixels $p=p_1, p_2, \ldots, p_n=p'$ such that each pixel $p' \in C$ and any two sequential pixels $p_1$, $p_{1+l}$ are adjacent to each other. We consider two pixels to be adjacent if one pixel is among the eight closest neighbours of the other.

Note that only connected components within a given colour bucket are computed. When the computation of the connected components is complete, each pixel will belong to exactly one connected component. We classify pixels as either coherent or incoherent depending on the size in pixels of its connected component. A pixel is coherent if the size of its connected component exceeds a fixed value $\tau$; otherwise, the pixel is incoherent. $\tau$ is usually set to 1% of the visual item size.

It has been found that a colour coherence vector in the HSV colour space quantized into 166 colours (giving a 332 bins vector), compared with $L_1$ the distance, were the best visual descriptors tested in terms of retrieval effectiveness, computational costs and response time.

Like conventional colour histograms, colour coherence vectors can be sensitive to changes in light conditions. A way to retain light-independent colour properties could be to use only the hue and the saturation components in the HSV colour descriptors or to normalize the red, green and blue of the RGB colour space through their sum.

Joint histograms, well known to the person skilled in the art, are a generalization of colour coherence vectors and colour histograms. By taking into account not only colour coherence, but a set of local pixel features, they can be seen as multidimensional histograms. Each entry in a joint histogram contains a number of pixels in the image that are described by a particular combination of features values. More precisely, given a set of k features, where the l-th feature has $n_l$ possible values, a joint histogram is a k-dimensional vector, such that each entry in the joint histogram contains the percentage of pixels in a visual item that are described by a k-tuple of feature values. The size of the joint histogram is therefore $$n = \prod_{l=1}^{k} n_l,$$

the number of possible combinations of the values of each feature. Just as a colour histogram encodes the density of pixel colour, a joint histogram encodes the joint density of several pixel features. A colour coherence vector can be seen as a joint histogram that uses as features only colours and colour coherence. Colour grid histograms can be seen as joint histograms that use, as features, colours and position in terms of belonging to a specific sub-area. By using some more additional features like edge density (the edge density of a pixel is the ratio of edges to pixels in a small neighbourhood surrounding the pixel), texturedness (the texturedness of a pixel is the number of neighbouring pixels whose intensities differ by more than a fixed value), gradient magnitude (the gradient magnitude is a measure of how rapidly intensity is changing in the direction of the greatest change), rank (the rank of a pixel p is defined as the number of pixels in the local neighbourhood whose intensity is less than the intensity of p), etc . . . , joint histograms provide finer distinctions than colour coherence vectors.

The procedure to extract the joint histogram from a visual item depends on the features chosen to characterize the visual content. Normally features that can be computed efficiently in linear time are chosen.

Apart from colour grid histograms and colour coherence vectors, which can be seen as joint histograms, a joint histogram that uses, as features, colour, colour coherence and average texture complexity is used. The average texture complexity was estimated taking advantage of compressed domain information embedded in the MPEG-2 video streams. The 64 coefficients of the discrete cosine transform of each block were set to the maximum value if they were above a fixed threshold and set to zero if they were below the threshold. A block was judged as "complex" if the number of non-zero pixels was above another predefined threshold. In addition to colour and colour coherence, each pixel of a key-frame was classified in two classes depending on the texture complexity of the block it belongs to.

The average retrieval performances of the joint histogram are comparable with the ones obtained by employing colour coherence vectors. The additional texture feature improved the discriminative power, however the costs to implement said features are relatively high.

I-Frames were exploited to improve Key-Frames retrieval effectiveness. If the key-frames are not chosen according to particular criteria, then employing the visual descriptors of the neighbouring I-frames could improve the retrieval effectiveness of the jump to the next (previous) similar image functionality. Instead of considering only one visual descriptor for each key-frame, all the visual descriptors of a group of I-frames close to the key-frame were computed, furthermore we assign to it the descriptor whose distance is the closest to the query.

A more precise description of this technique follows. We make the assumption that, for each shot, the first I-frame is chosen as key-frame. Given a video sequence $V=[f_0, f_i, \ldots, f_n]$, where $f_1 \in V$ is the i-th I-frame, let $k_q \in V$ be the query key-frame and range be the maximum distance above which two images are not considered similar.

$$\forall k_s \in V \; s.t. \text{distance}(k_q,k_s) \text{ then}$$

$$S=\{f_1 | s \leqq i \leqq s+N, N \geqq 0\}$$

$$\exists f' \in S \; s.t. d=\text{distance}(k_q,f') \wedge \forall f \in S: d \leqq \text{distance}(k_q,f)$$

Finally to the key-frame $k_s$ is assigned the descriptor associated to the I-frame f' and the distance value d.

In a preferred implementation N different constant values have been chosen. Furthermore, all the I-frames of each shot (in this case N depends on the lengths of the shots) have been exploited.

It has been found that image similarity search is possible and very effective when performed over the key-frames of a single program. Performing the search within different programs is also possible but more difficult because of the high number of key-frames involved. With hundreds of thousands of images, the main problems are false positives and high response time.

False positives are due to different images with similar visual descriptors. The more are the images, the higher is the probability to find frames with very similar colours but very different content. To reduce the number of false positives, that is to increase the precision of the search, very discriminative visual descriptors can be used.

Very discriminative descriptors may further increase the response time because of their computational complexity. To reduce the response time, two strategies can be adopted even in conjunction. The first strategy, known as pre-filtering, makes use of a coarse descriptor to select a first set of potential similar images. The very discriminative and computational expensive descriptor is then only used to select images within the first set, thus requiring a more acceptable response time. The second strategy consists in avoiding sequential scanning in comparing descriptors. Data access structures well known in the art, like the R-Tree, the S-Tree or the M-Tree allow the organization of the descriptors in ways such that it is possible to retain only relevant images without analysing the entire database. These indexes require the descriptors to be modelled as points in vector or metric spaces and they add some computational costs to the database management system. Thus, they are suitable for very large video (image) databases.

Though the invention is described with reference to preferred embodiments thereof, it is to be understood that these are non-limitative examples. Thus, various modifications are conceivable to those skilled in the art, without departing from the scope of the invention, as defined by the claims. As an example, the table of content comprising characteristics of recorded material could be provided by third parties as a service of making the recorded material more attractive to the user. If the table of content is based on the interests of the user, his interest determines the extent of similarity between portions of the information signal.

The use of the verb "to comprise" and its conjugations does not exclude the presence of elements or steps other than those stated in a claim. Furthermore, the use of the article "a" or "an" preceding an element does not exclude the presence of a plurality of such elements. In the claims, any reference signs placed between parenthesis shall not be construed as limiting the scope of the claims. The invention may be implemented by means of hardware as well as software. Several "means" may be represented by the same item of hardware. Furthermore, the invention resides in each and every novel feature or combination of features.

What is claimed is:

1. An apparatus for reproducing an information signal stored on a first storage medium, the apparatus comprises:

reading means for reading the information signal from the first storage medium, output means for supplying the information signal to a display unit, user controllable input means for receiving commands to enable a user to access the information signal, wherein the user controllable input means is adapted to receive a first command at an instant, the apparatus further comprises means for controlling the reading means to start reading the information signal from said storage medium at a second position in the information signal, the information signal at said second position having features showing a similarity with features of the information signal at a first position read at said instant of receiving said first command, or features of the information signal read prior to said instant and further adapted to read a data signal from a second storage medium, the data signal comprising information about positions in the information signal and other positions in the information signal having similar features.

2. The apparatus according to claim 1 wherein the apparatus further comprises:

extraction means for extracting said features from the information signal, means for determining dependence of said extracted features positions having similar features so as to obtain said data signal, and writing means for writing said data signal on said second storage medium.

3. The apparatus according to claim 1 wherein the features have a relationship with the color histogram of images corresponding to positions in the information signal.

4. The apparatus according to claim 1 wherein the features have a relationship with the color grid histogram of images corresponding to positions in the information signal.

5. The apparatus according to claim 1 wherein the features have a relationship with the color structure histogram of images corresponding to positions in the information signal.

6. The apparatus according to claim 1 wherein the user controllable input means comprises input means for controlling the reading means to start reading the information signal at a position which follows the position in the information signal at said instant.

7. The apparatus according to claim 1 wherein the user controllable input means comprises input means for controlling the reading means to start reading the information signal at a position which is preceding to the position in the information signal at said instant.

8. Method of reproducing an information signal stored on a first storage medium, the method comprises the step of:

reading the information signal from the first storage medium, supplying the information signal to a display unit, receiving commands to enable a user to access the information signal, characterized in that the method further comprises the steps of:

receiving a first command at an instant, start reading the information signal from said storage medium at a second position in the information signal, the information signal at said second position showing a similarity with the information signal at a first position read at said instant of receiving said first command, or showing similarity with a part of the information signal read prior to said instant and reading a data signal from a second storage medium, the data signal comprising information about positions in the information signal and other positions in the information signal having similar features.

9. A computer readable-medium having stored thereon a program for enabling a processor to carry out the method according to claim 8.

* * * * *